(12) United States Patent
Holmberg

(10) Patent No.: US 8,068,605 B2
(45) Date of Patent: Nov. 29, 2011

(54) PROGRAMMABLE KEYPAD

(75) Inventor: Per Holmberg, Dalby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1344 days.

(21) Appl. No.: 11/627,003

(22) Filed: Jan. 25, 2007

(65) Prior Publication Data

US 2007/0213090 A1 Sep. 13, 2007

Related U.S. Application Data

(60) Provisional application No. 60/779,428, filed on Mar. 7, 2006.

(51) Int. Cl.
*H04M 1/00* (2006.01)

(52) U.S. Cl. .................. 379/387.01; 345/169; 345/173; 361/679.04; 361/679.27; 715/810; 715/835

(58) Field of Classification Search ...... 379/387.01–397; 345/173; 715/810, 835
See application file for complete search history.

(56) References Cited

U.S. PATENT DOCUMENTS

| | | | | |
|---|---|---|---|---|
| 4,870,677 | A * | 9/1989 | Di Santo et al. | 379/93.19 |
| 2003/0174072 | A1 * | 9/2003 | Salomon | 341/22 |
| 2003/0179190 | A1 * | 9/2003 | Franzen | 345/173 |
| 2005/0146498 | A1 | 7/2005 | Hemia et al. | |
| 2005/0169527 | A1 * | 8/2005 | Longe et al. | 382/177 |
| 2007/0024593 | A1 * | 2/2007 | Schroeder | 345/173 |
| 2008/0088602 | A1 * | 4/2008 | Hotelling | 345/173 |

FOREIGN PATENT DOCUMENTS

| | | |
|---|---|---|
| EP | 1 621 974 A2 | 2/2006 |
| GB | 2402105 | 12/2004 |
| WO | WO 03/021922 | 3/2003 |

OTHER PUBLICATIONS

Written Opinion of the International Preliminary Examining Authority dated May 27, 2008, issued in corresponding PCT application No. PCT/IB2007/050475, 9 pages.
International Search Report and Written Opinion for corresponding PCT Application No. PCT/IB2007/050475 mailed Jan. 14, 2008, 14 pages.
International Preliminary Report on Patentability dated Jun. 25, 2008 issued in corresponding PCT application No. PCT/IB2007/050475, 11 pages.

* cited by examiner

*Primary Examiner* — Fan Tsang
*Assistant Examiner* — Ibraham Sharifzada
(74) *Attorney, Agent, or Firm* — Snyder, Clark, Lesch & Chung, LLP

(57) ABSTRACT

A device may include logic configured to process a request for a keypad layout, and to provide a keypad layout via keypad display in response to the processed request.

22 Claims, 11 Drawing Sheets

| | DISPLAY SETTING FIELD 410 | ILLUMINATION FIELD 420 | DISPLACEMENT FIELD 430 | INPUT FIELD 440 |
|---|---|---|---|---|
| FIRST ENTRY 402 | NUMBERS (001) | FRONTLIT | YES | FINGER/ VOICE |
| SECOND ENTRY 404 | MUSIC (002) | BACKLIT | NO | FINGER/ STYLUS/ VOICE |
| THIRD ENTRY 406 | TABLET (003) | NONE | NO | STYLUS/ VOICE |

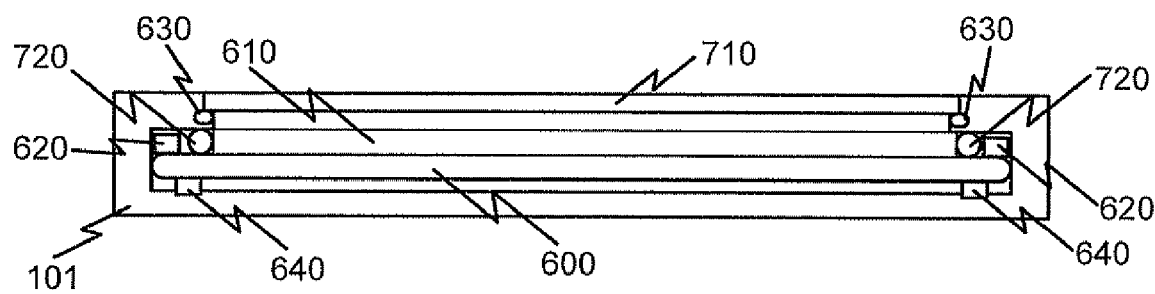
FIG. 7
FIG. 8A
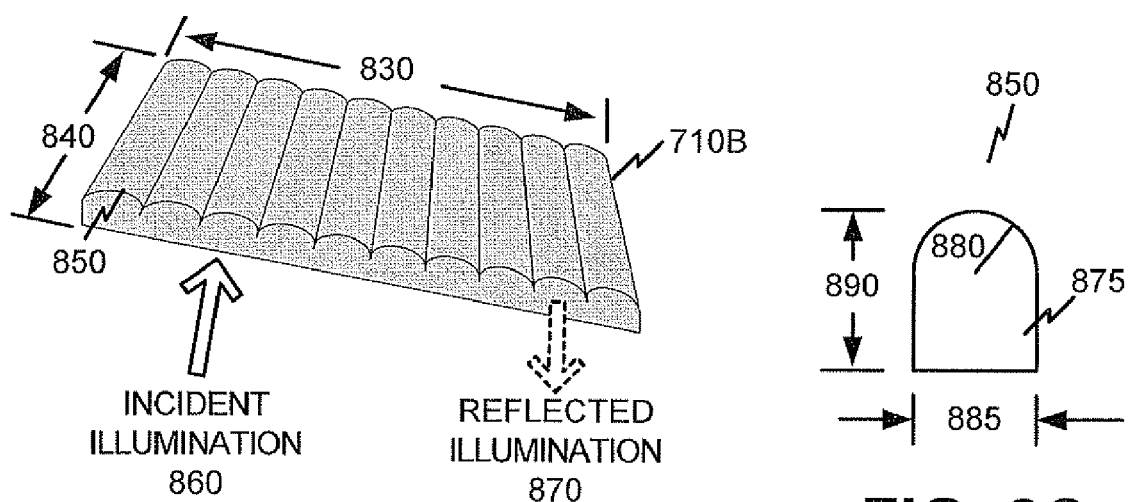
FIG. 8B
FIG. 8C

PROGRAMMABLE KEYPAD

RELATED APPLICATION

This application claims priority under 35 U.S.C. §119 based on U.S. Provisional Application No. 60/779,428, filed on Mar. 7, 2006, the disclosure of which is hereby incorporated herein by reference.

BACKGROUND OF THE INVENTION

1. Technical Field of the Invention

Implementations described herein relate generally to input devices, and more particularly, to input devices that can be used in handheld devices.

2. Description of Related Art

Devices, such as mobile communication devices, may be used by individuals in a variety of settings due to the portability of these devices. For example, individuals may use their mobile devices while at work, home, or in transit from one location to another location. As a result, individuals may find it convenient to carry their mobile devices with them substantially all of the time.

Since individuals may have their mobile devices with them in many situations, these individuals may find it convenient if the mobile devices can be used to perform functions other than receiving or making calls. For example, individuals may find it convenient to play recorded songs on their mobile devices or to play games on their mobile devices when not engaged in a communication session.

Individuals may find keypads on mobile devices cumbersome to use when mobile devices are used for applications other than placing or receiving calls. For example, keypads on mobile devices may be configured to allow the user to enter numbers into the mobile device for performing particular functions. As a result, individuals may need to memorize special sequences when using a keypad for non-calling functions, such as remembering that key "5" causes a song to play, while key "6" causes a song to pause.

BRIEF SUMMARY OF THE INVENTION

According to one aspect, a device is provided. The device may comprise logic configured to process a request for a keypad layout, and to provide the keypad layout via keypad display in response to the processed request. Implementations of the logic may be further configured to apply power to the keypad display to provide the keypad layout, and to remove power from the keypad display without erasing the keypad layout. The logic may be configured to reapply power to the keypad display to modify the keypad layout.

Implementations of the device may include logic configured to receive a user request via the keypad display, and to modify the keypad layout in response to the user request. The device may further include a display and the logic may be further configured to receive an input associated with a first one of a plurality of applications or functions provided by the device and provide a keypad layout associated with the first application or function via the keypad display. Implementations of the logic may be configured to detect a presence of a user or an input device, acknowledge the presence via the keypad display, and modify the keypad layout in response to the acknowledged presence. Implementations of the device may include logic configured to detect a pressure related to a user request, and to use the detected pressure to initiate processing of the user request.

Implementations of the device may include logic configured to provide front lighting or back lighting to the keypad display based on the keypad layout. Implementations of the logic may be further configured to allow a user to request the keypad layout using at least one of a control key, a function button, a voice input, a menu selection, or a touch input.

According to another aspect, a method is provided. The method may comprise providing a first keypad layout via a programmable keypad; receiving an input via the programmable keypad, a display device, an input device or a spoken command; and providing a second keypad layout via the programmable keypad in response to the input. In the method, the providing a first keypad layout may further comprise providing the first keypad layout via an electrophoretic based programmable keypad or a liquid crystal display based programmable keypad. In the method, receiving an input may further comprise using pressure or presence to detect the input.

Implementations of the method may further comprise receiving the input via a user's digit, a stylus, or a spoken command. Implementations of the method may further comprise acknowledging the input via tactile feedback and illuminating a portion of the programmable keypad in response to the input. Implementations of the method may further comprise providing information via a display device in response to the input, where the provided information is related to the first keypad layout, or the second keypad layout.

According to yet another aspect, a mobile communications terminal is provided. The mobile communications terminal may include a programmable keypad configured to receive input from a user, and processing logic configured to receive a request for a configuration of the programmable keypad, provide the requested configuration to the user via the programmable keypad, receive an input via the programmable keypad based on the configuration, and provide information to the user via the programmable keypad or the display based on the input. The mobile communications terminal may include processing logic that is further configured to receive the request via a control key, an input device associated with a function performed by the mobile communications terminal, a microphone, a touch-sensitive portion of the display, or the programmable keypad, and provide the information to the user via the programmable keypad using electrophoretic based display or a liquid crystal display. Implementations of the processing logic may further be configured to provide the requested configuration using one of a number of languages. Implementations of the processing logic may be further configured to receive an input associated with a first one of a plurality of applications or functions provided by the mobile communications terminal and provide a user interface associated with the first application or function via at least one of the programmable keypad or the display.

According to yet another aspect, a computer readable medium that stores instructions executable by a processing device operating in a mobile communications terminal is provided. The computer readable medium may comprise instructions to receive an input via a programmable keypad, instructions to process the input, and instructions to reconfigure the programmable keypad in response to the processing.

According to still another aspect, a mobile communications terminal is provided. The mobile communications terminal may comprise means for providing information via a programmable keypad; means for receiving an input via the programmable keypad; means for processing the input; and means for providing new information via the programmable keypad in response to the processing.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 4 illustrates an exemplary data structure consistent with the principles of the invention;

FIG. 7 illustrates a side view of an exemplary implementation of a programmable keypad consistent with the principles of the invention;

FIGS. 8A-8C illustrate exemplary implementations of an overlay that can be used with implementations of a programmable keypad consistent with the principles of the invention;

DETAILED DESCRIPTION OF THE INVENTION

The following detailed description of the invention refers to the accompanying drawings. The same reference numbers in different drawings may identify the same or similar elements. Also, the following detailed description does not limit the invention.

Implementations of the invention can be used to improve a user interface, such as a keypad, on a device (e.g., a communications device). Implementations of the invention may change the appearance and/or configuration of the user interface using logic, such as machine-readable instructions executed by a processing device. In some instances, the changing of the appearance and/or configuration of the user interface may be application controlled. That is, when a particular application is launched or being executed or a function associated with a particular application is being executed, the user interface may change based on the particular application. Implementations of the user interface may receive user inputs via touch, e.g., via a user's finger, via input devices, e.g., a stylus, via speech, and/or via other techniques and/or devices. The user interface may provide tactile feedback to the user via displacement logic when the user interface registers a user input.

Exemplary implementations of the invention will be described in the context of a mobile communications terminal. It should be understood that a mobile communication terminal is an example of a device that can employ a programmable keypad consistent with the principles of the invention and should not be construed as limiting the types or sizes of devices or applications that can use implementations of programmable keypads described herein. For example, programmable keypads consistent with the principles of the invention may be used on desktop communication devices, household appliances, such as microwave ovens and/or appliance remote controls, automobile radio faceplates, industrial devices, such as testing equipment, etc.

Exemplary Mobile Terminal

Figure 1:
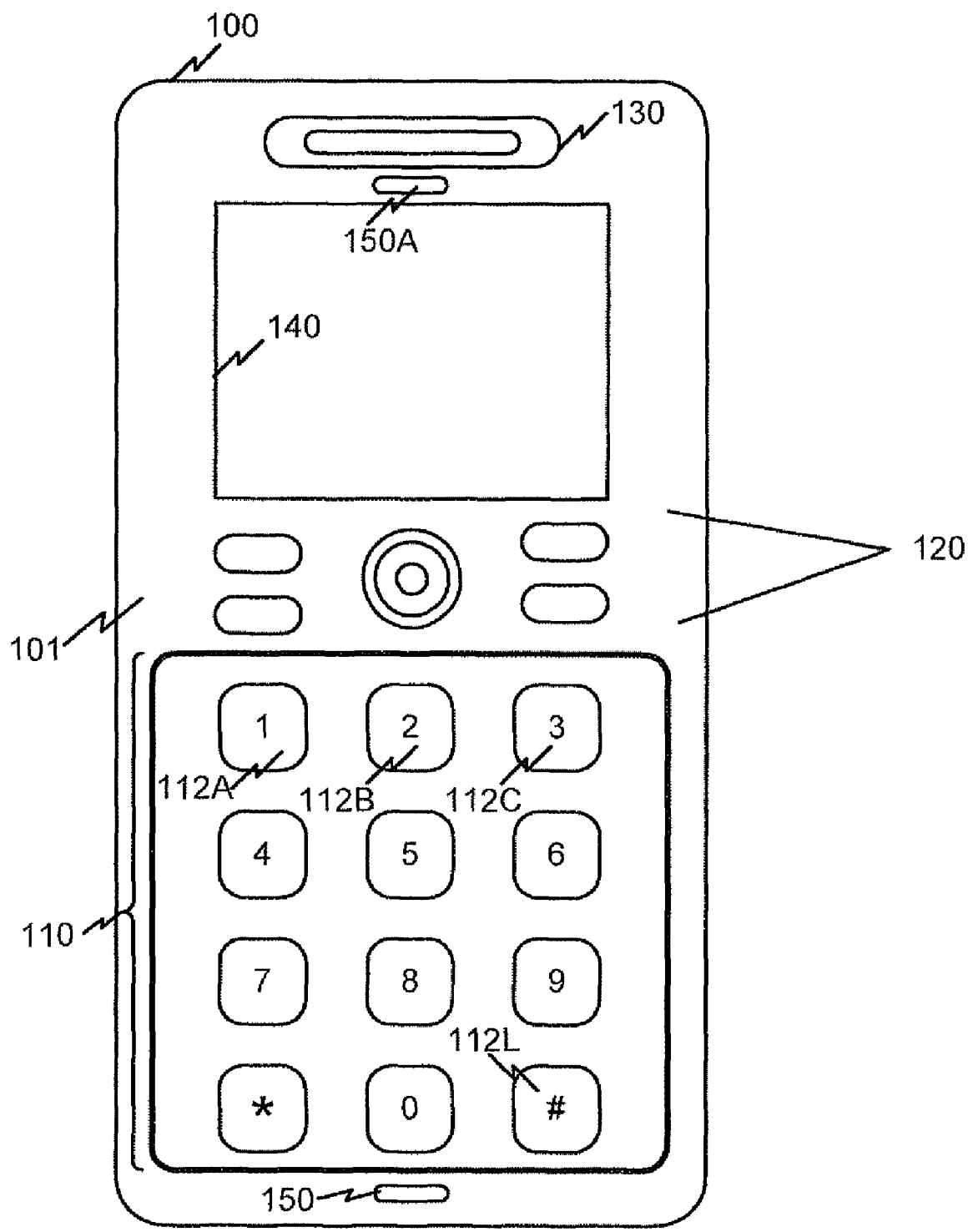
FIG. 1 is a diagram of an exemplary implementation of a mobile terminal consistent with the principles of the invention.

FIG. 1 is a diagram of an exemplary implementation of a mobile terminal consistent with the principles of the invention. Mobile terminal 100 (hereinafter terminal 100) may be a mobile communication device. As used herein, a "mobile communication device" and/or "mobile terminal" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, and/or global positioning system (GPS) receiver; and a laptop and/or palmtop receiver or other appliance that includes a radiotelephone transceiver.

Terminal 100 may include housing 101, keypad area 110 containing keys 112A-L, control keys 120, speaker 130, display 140, and microphones 150 and 150A. Housing 101 may include a structure configured to hold devices and components used in terminal 100. For example, housing 101 may be formed from plastic, metal, or composite and may be configured to support keypad area 110, control keys 120, speaker 130, display 140 and microphones 150 and/or 150A.

Keypad area 110 may include devices and/or logic that can be used to display images to a user of terminal 100 and to receive user inputs in association with the displayed images. For example, an image may be displayed via keypad area 110. Implementations of keypad area 110 may be configured to receive a user input when the user interacts with the displayed image. For example, the user may provide an input to keypad area 110 directly, such as via the user's finger, or via other devices, such as a stylus. User inputs received via keypad area 110 may be processed by components or devices operating in terminal 100.

In one implementation, keypad area 110 may be configured to display key images 112A-L (collectively keys 112). Implementations of keys 112 may have key information associated therewith, such as numbers, letters, symbols, etc. A user may interact with keys 112 to input key information into terminal 100. For example, a user may operate keys 112 to enter digits, commands, and/or text, into terminal 100.

Control keys 120 may include buttons that permit a user to interact with terminal 100 to cause terminal 100 to perform an action, such as to display a text message via display 140, raise or lower a volume setting for speaker 130, configure the appearance of keypad area 110, etc.

Speaker 130 may include a device that provides audible information to a user of terminal 100. Speaker 130 may be located in an upper portion of terminal 100 and may function as an ear piece when a user is engaged in a communication session using terminal 100. Speaker 130 may also function as an output device for music and/or audio information associated with games and/or video images played on terminal 100.

Display 140 may include a device that provides visual information to a user. For example, display 140 may provide information regarding incoming or outgoing calls, text messages, games, phone books, the current date/time, volume settings, etc., to a user of terminal 100. Implementations of display 140 may be implemented as black and white or color displays, such as liquid crystal displays (LCDs).

Microphones 150 and/or 150A may, each, include a device that converts speech or other acoustic signals into electrical signals for use by terminal 100. Microphone 150 may be located proximate to a lower side of terminal 100 and may be configured to convert spoken words or phrases into electrical signals for use by terminal 100. Microphone 150A may be located proximate to speaker 130 and may be configured to receive acoustic signals proximate to a user's ear while the user is engaged in a communications session using terminal 100. For example, microphone 150A may be configured to receive background noise as an input signal for performing background noise cancellation using processing logic in terminal 100.

Exemplary Functional Diagram

Figure 2:
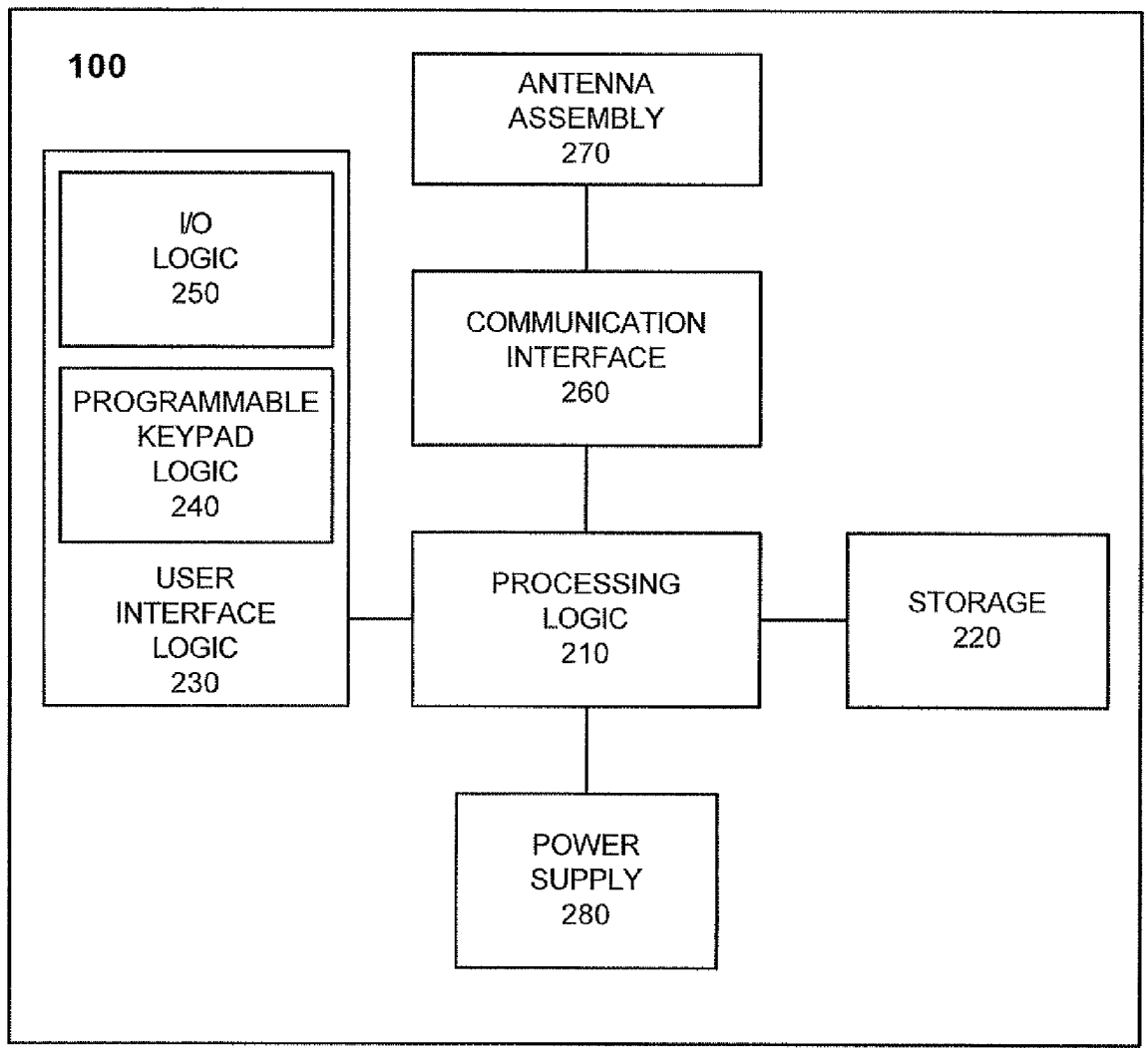
FIG. 2 illustrates an exemplary functional diagram of a mobile terminal consistent with the principles of the invention.

FIG. 2 illustrates an exemplary functional diagram of a mobile terminal consistent with the principles of the invention. As shown in FIG. 2, terminal 100 may include processing logic 210, storage 220, user interface logic 230, communication interface 260, antenna assembly 270, and power supply 280.

Processing logic 210 may include a processor, microprocessor, an application specific integrated circuit (ASIC), field programmable gate array (FPGA), or the like. Processing logic 210 may include data structures or software programs to control operation of terminal 100 and its components. Implementations of terminal 100 may use an individual processing logic component or multiple processing logic components, such as processing logic components operating in parallel. Storage 220 may include a random access memory (RAM), a read only memory (ROM), a magnetic or optical disk and its corresponding drive, and/or another type of memory to store data and instructions that may be used by processing logic 210.

User interface logic 230 may include mechanisms, such as hardware and/or software, for inputting information to terminal 100 and/or for outputting information from terminal 100. In one implementation, user interface logic 230 may include programmable keypad logic 240 and input/output logic 250.

Programmable keypad logic 240 may include mechanisms, such as hardware and/or software, used to configure an appearance of keypad area 110 and/or to receive user inputs via keypad area 110. For example, programmable keypad logic 240 may replace keys 112A-L and/or labels associated with keys 112A-L (FIG. 1) using a menu of selections with which the user can interact using a stylus. The menu may be based on a request received from a user of terminal 100, such as a request for a menu that allows the user to enter commands to perform desired actions with terminal 100. In some implementations, programmable keypad logic 240 may be application controlled and may automatically re-configure the appearance of keypad area 110 based on an application being launched by the use of terminal 100, the execution of a function associated with a particular application/device included in terminal 100 or some other application specific event.

For example, if terminal 100 includes a media player and the user begins using the media player, programmable keypad logic 240 may change the appearance of keypad area 110 to tailor the keypad area 110 for the media player, as described in detail below. In another instance, terminal 100 may include a camera function. If the user of terminal 100 presses a shutter button associated with the camera, terminal 100 may change the appearance of keypad area 110 to tailor the keypad area for the camera functionality.

Input/output logic 250 may include hardware or software to accept user inputs to make information available to a user of terminal 100. Examples of input and/or output mechanisms associated with input/output logic 250 may include a speaker (e.g., speaker 130) to receive electrical signals and output audio signals, a microphone (e.g., microphone 150 or 150A) to receive audio signals and output electrical signals, buttons (e.g., control keys 120) to permit data and control commands to be input into terminal 100, and/or a display (e.g., display 140) to output visual information.

Communication interface 260 may include, for example, a transmitter that may convert base band signals from processing logic 210 to radio frequency (RF) signals and/or a receiver that may convert RF signals to base band signals. Alternatively, communication interface 260 may include a transceiver to perform functions of both a transmitter and a receiver. Communication interface 260 may connect to antenna assembly 270 for transmission and reception of the RF signals. Antenna assembly 270 may include one or more antennas to transmit and receive RF signals over the air. Antenna assembly 270 may receive RF signals from communication interface 260 and transmit them over the air and receive RF signals over the air and provide them to communication interface 260.

Power supply 280 may include one or more power supplies that provide power to components of terminal 100. For example, power supply 280 may include one or more batteries and/or connections to receive power from other devices, such as an accessory outlet in an automobile, an external battery, or a wall outlet. Power supply 280 may also include metering logic to provide the user and components of terminal 100 with information about battery charge levels, output levels, power faults, etc.

As will be described in detail below, terminal 100, consistent with the principles of the invention, may perform certain operations relating to adaptively configuring keypad area 110 in response to user inputs or in response to instructions associated with processing logic 210. Terminal 100 may perform these operations in response to processing logic 210 executing software instructions of a keypad configuration/reprogramming application contained in a computer-readable medium, such as storage 220. A computer-readable medium may be defined as a physical or logical memory device and/or carrier wave.

The software instructions may be read into storage 220 from another computer-readable medium or from another device via communication interface 260. The software instructions contained in storage 220 may cause processing logic 210 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing Logic Functional Diagram

Figure 3:
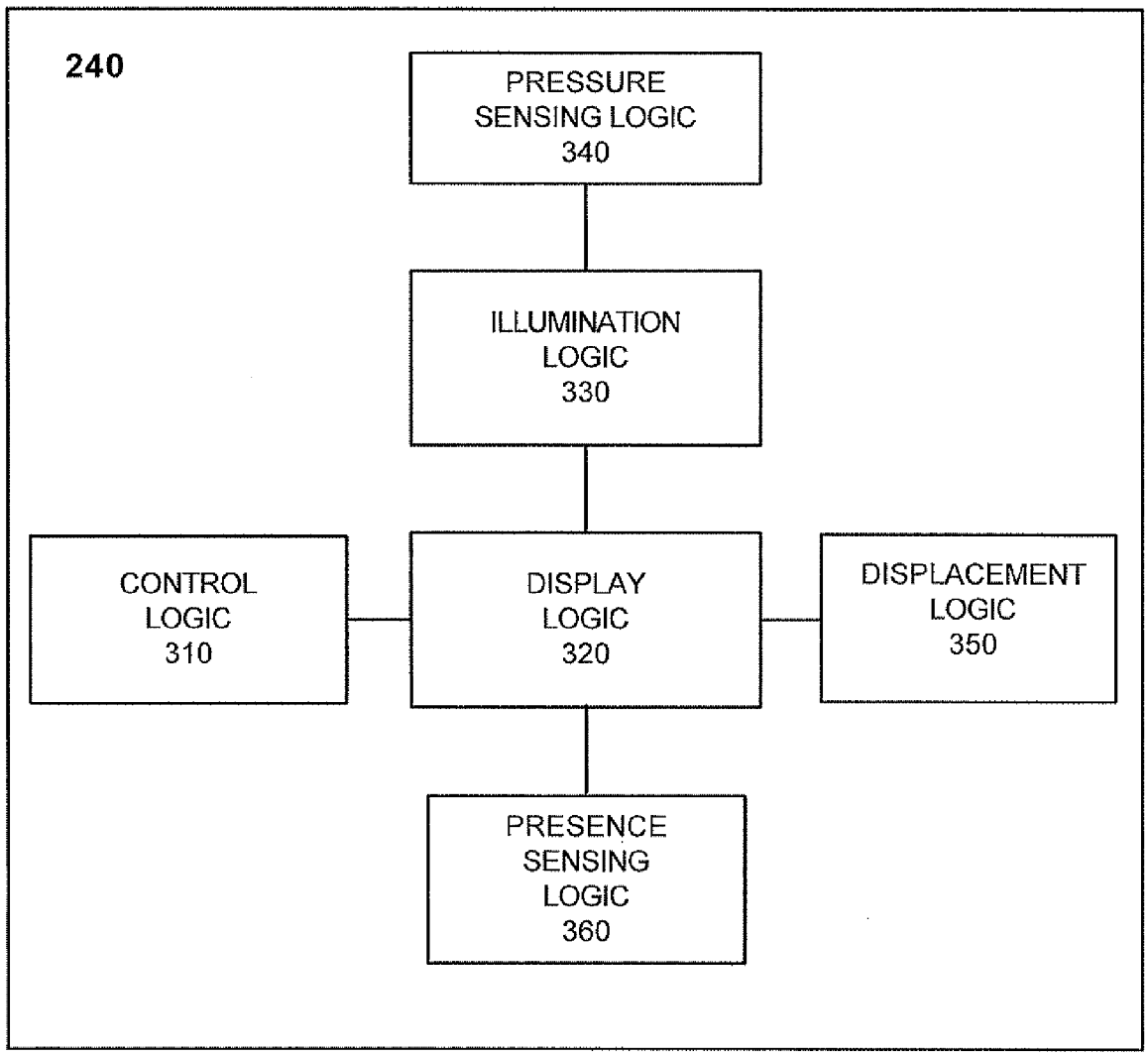
FIG. 3 illustrates an exemplary functional diagram of the programmable keypad logic of FIG. 2 consistent with the principles of the invention.

FIG. 3 illustrates an exemplary functional diagram of the programmable keypad logic 240 of FIG. 2 consistent with the principles of the invention. Programmable keypad logic 240 may include control logic 310, display logic 320, illumination logic 330, pressure sensing logic 340, displacement logic 350, and presence sensing logic 360.

Control logic 310 may include logic that controls the operation of display logic 320, logic operating with display logic 320, and/or processes involved with display logic 320. Control logic 310 may be implemented as standalone logic or as part of processing logic 210. Moreover, control logic 310 may be implemented in hardware or software.

Display logic 320 may include logic to present information to a user of terminal 100. Display logic 320 may include processing logic to interpret signals and instructions and a display device having a display area to provide information to a user of terminal 100. Implementations of display logic 320 may include mediums that change properties as light passes through the mediums, or display logic 320 may include mediums that reflect light. For example, one implementation of display logic 320 may include a liquid crystal display (LCD) technology that includes, for example, biphenyl or another stable liquid crystal material. LCD based implementations of display logic 320 may include thin film transistor (TFT) LCDs that may include a liquid crystal structure placed between two glass plates that can be charged to cause changes in the liquid crystal structure so as to change color characteristics of light passing through the liquid crystal structure. Implementations using LCD based technologies can be twisted nematic (TN), super twisted nematic (STN), film compensated STN (FSTN), color STN, etc. Implementations employing LCD based technologies may use back lighting or front lighting to enhance the appearance of images produced by display logic 320.

Display logic 320 may incorporate other display technologies, such as electrophoretic based technologies (e.g., electronic ink technologies). Electronic ink technologies may use bistable microcapsules that can contain oppositely charged black and white pigments that may float in a clear liquid. The pigments may rise and fall in the liquid depending on an applied electrical charge. In one implementation, the microcapsules may be placed between a clear plastic sheet and a sheet of metal foil. Implementations using electronic ink may be capable of maintaining an image when voltage is removed, e.g., if a signal is applied to make the number "5" appear on keypad area 110, the number "5" will remain after the signal is removed. Electronic ink implementations may not require backlighting, which can help prolong battery life in mobile devices using electronic ink based implementations of display logic 320. Implementations employing electronic ink technologies may draw less current than other technologies, such as LCD based technologies.

Illumination logic 330 may include logic to provide illumination to an upper surface of a display device or a lower surface of a display device. For example, illumination logic 330 may be used to provide front lighting to an upper surface of a display device that faces a user. Front lighting may enhance the appearance of a display device by making information on the display device more visible in high ambient lighting environments, such as viewing a display device outdoors. Illumination logic 330 may also be used to provide backlighting to a lower surface, or rear surface, of a display device, such as a surface of a display device that faces away from a user. Backlighting may be used with LCD based implementations of a display device to make images brighter and to enhance the contrast of displayed images.

Implementations of illumination logic 330 may employ light emitting diodes (LEDs) or other types of devices to illuminate portions of a display device. Illumination logic 330 may provide light within a narrow spectrum, such as a particular color, or via a broader spectrum, such as full spectrum lighting.

Pressure sensing logic 340 may include logic to measure a force exerted on a portion of terminal 100. For example, an implementation of pressure sensing logic 340 may include a resistive, capacitive, or other type of pressure sensing device. In one implementation, pressure sensing logic 340 may include a transparent or semi-transparent film that can be placed over display logic 320. The film may be adapted to change an output, such as a voltage or current, as a function of an amount of pressure exerted on the film and/or based on a location where pressure is exerted on the film. For example, assume that a user presses on the film in an upper left hand corner of the film. The film may produce an output that represents the location at which the pressure was detected. The output may also represent an amount of pressure that was exerted on the film.

Displacement logic 350 may include logic to cause a displacement, such as a vibration, in response to an action, such as a user action or an action performed in response to an instruction from control logic 310 or processing logic 210. Implementations of displacement logic 350 may include linear or nonlinear magnetic actuators, linear or nonlinear piezoelectric actuators, etc. In one implementation of terminal 100, displacement logic 350 may be used to provide tactile or haptic feedback to a user. For example, a user may exert a pressure on keypad area 110 at a location corresponding to key 112A. When the user has exerted a pressure, or force, that exceeds a determined threshold, displacement logic 350 may cause a portion of terminal 100 to vibrate so that the user knows terminal 100 has registered an input signal associated with key 112A.

Presence sensing logic 360 may include logic that senses the presence of an object. Implementations of presence sensing logic 360 may be configured to sense the presence and location of an object. For example, presence sensing logic 360 may be configured to determine the location in keypad area 110 where a user places his/her finger regardless of how much pressure the user exerts on keypad area 110. Implementations of presence sensing logic 360 may use thermal, pressure, vibration, location, etc. sensing techniques to identify and receive inputs. Presence sensing logic 360 may also use capacitive, resistive, inductive, acoustic, optic, etc., based sensing devices to identify the presence of an object and to receive an input via the object.

Exemplary Data Structure

FIG. 4 illustrates an exemplary data structure consistent with the principles of the invention. Data structure 400 may include a computer-readable medium that can be used to store information in a machine-readable format and may be stored in storage 220. In an exemplary implementation, data structure 400 may be used to store information that is used to modify the look and/or feel of keypad area 110, as described in detail below.

Data structure 400 may include information arranged in fields, such as display setting field 410 illumination field 420, displacement field 430, and input field 440. Information in data structure 400 may be arranged in a row and column format to facilitate interpretation by a user of terminal 100 and/or user by processing logic 210. Entries 402-406 may be used to identify information associated with display setting field 410, illumination field 420, displacement field 430, and input field 440.

Display setting field 410 may include information that identifies a type of display that is presented to a user via keypad area 110. For example, a user may see a "numbers" keypad layout, a "music" keypad layout, or a "tablet" keypad layout in keypad area 110. Entries for display setting field 410 may include numeric identifiers, such as addresses, that can be used by processing logic 210 when processing information in data structure 400. The numbers keypad layout associated with entry 402 may be similar to the keypad area illustrated in FIG. 5A, the music keypad layout associated with entry 404 may be similar to the keypad area illustrated in FIG. 5B and the tablet keypad layout associated with entry 406 may be similar to the keypad area illustrated in FIG. 5C.

Figure 5A:
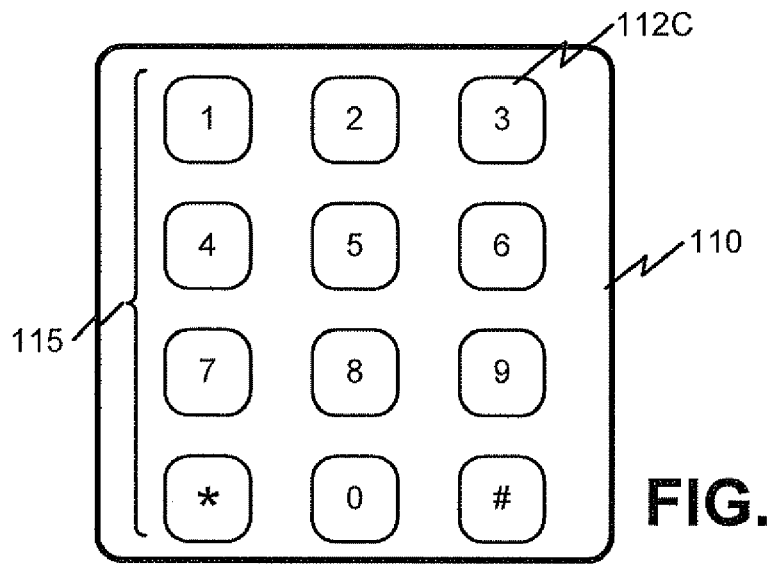
FIGS. 5A-C illustrate exemplary keypad implementations consistent with the principles of the invention.
Figure 5B:
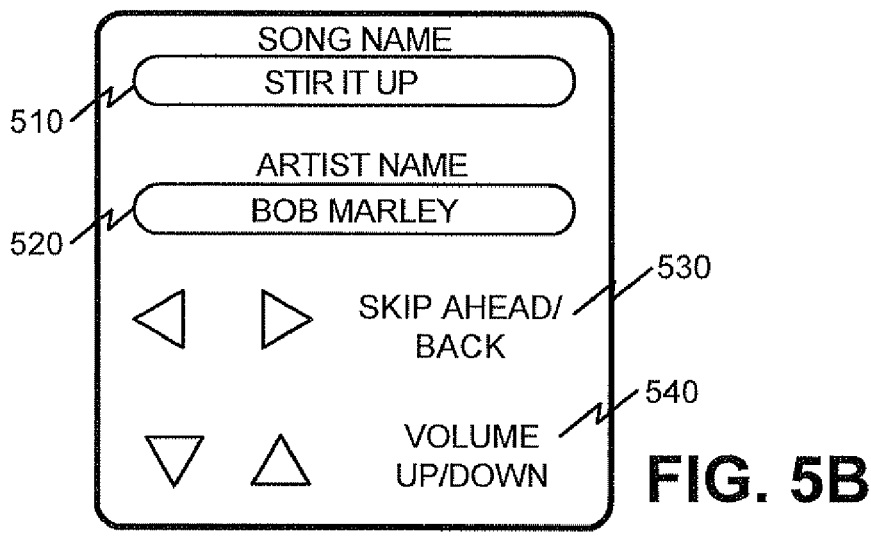
Figure 5C:
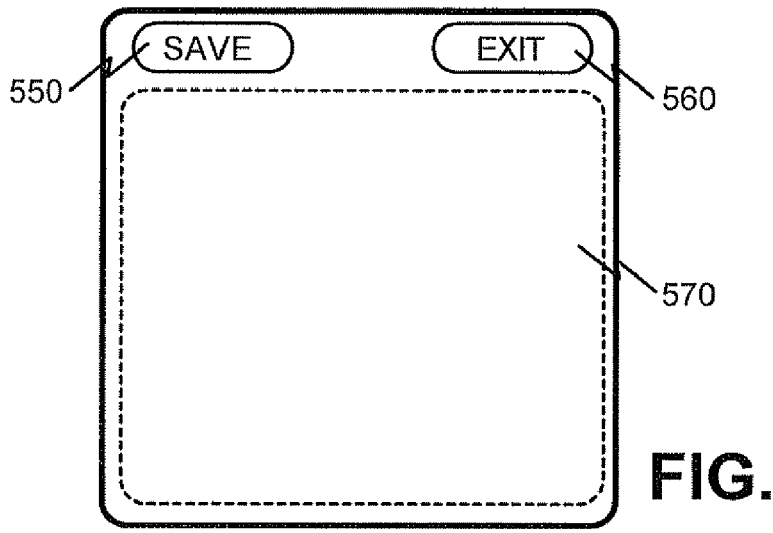

In FIG. 5A, the numbers keypad layout may resemble a standard telephone keypad 115 and may include images resembling keys 112A-L. In FIG. 5B, the music keypad layout may include a song name field 510 to display information about a song title, an artist name field 520 to display information about an artist related to the song identified in song name field 510, skip ahead/back buttons 530 to advance to a next song or a previous song, respectively, and volume buttons 540 to decrease or increase a volume for the song identified in song name field 510. In FIG. 5C, the tablet keypad layout may include a save button 550 to store information in writing area 570, an exit button 560 to exit the tablet keypad layout and writing area 570 to receive information from a user, such as handwriting information provided by, for example, a stylus.

Returning to FIG. 4, illumination field 420 may include information about illumination used with configurations of terminal 100. For example, illumination field 420 may include information that identifies whether front lighting or back lighting is used with an implementation of keypad area 110. In FIG. 4, the numbers keypad layout may be frontlit, the music keypad layout may be backlit, and the tablet keypad layout may not use any illumination.

Displacement field 430 may include information that indicates whether displacement techniques are used with an implementation of keypad area 110. For example, the numbers keypad layout may use displacement techniques to let a user know when terminal 100 has registered an input associated with keys 112A-L. Assume that a user places his/her finger on key 112C in FIG. 5A (i.e., the number 3). Terminal 100 may vibrate or provide some other feedback (e.g., audible, visual, tactile, etc.) to let the user know that an input associated with key 112C has been received by terminal 100. The music keypad layout and the tablet keypad layout may not use displacement techniques so the respective entries for these layouts may be populated with NO for displacement field 430.

Input field 440 may include information that identifies an input type that can be used with a particular keypad layout. For example, the numbers keypad layout may accept inputs via a user's finger or voice, music keypad layout may accept inputs from a user's finger, a stylus, or a user's voice, and the tablet keypad layout may accept inputs via a stylus or the user's voice. Input field 440 may also include information about thresholds used with various input types. For example, input field 440 may include pressure thresholds that need to be exceeded for pressure sensing logic 340 to register an input signal via a user's finger or a stylus. In contrast, input field 440 may include volume thresholds that need to be exceeded for terminal 100 to register voice inputs via microphone 150 or 150A. Implementations of data structure 400 may also include other fields, such as a presence field that can be used to store information used with presence sensing logic 360.

Exemplary Views

Figure 6A:
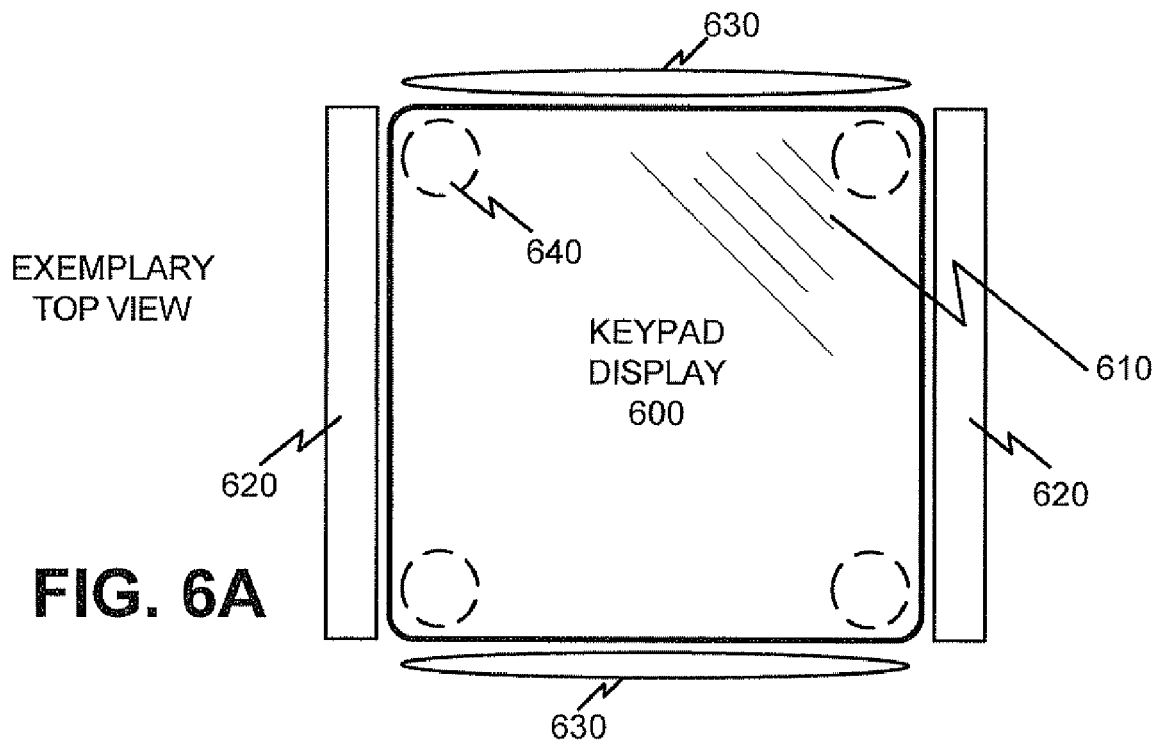
FIG. 6A illustrates a top view of an exemplary implementation of a programmable keypad consistent with the principles of the invention.

FIG. 6A illustrates a top view of an exemplary implementation of a programmable keypad consistent with the principles of the invention. The implementation of FIG. 6A may include keypad display 600, pressure film 610, displacement member 620, front lighting device 630, and presence device 640.

Keypad display 600 may be part of display logic 320 and may include a device for presenting visual information to a user. For example, keypad display 600 may be an LCD based display or an electronic ink based display device. Pressure film 610 may include a device that is part of pressure sensing logic 340 and that is configured to produce an output when a pressure is exerted on a surface of pressure film 610. For example, pressure film 610 may be a clear capacitive film that produces an output that is representative of a pressure applied thereto. Pressure film 610 may detect user inputs.

Displacement member 620 may include devices that are displaced a pre-determined, or variable, distance when actuated via an input signal. For example, displacement member 620 may be a linear piezoelectric actuator that is displaced a determined distance as a function of an input signal, such as an input voltage. In one implementation, displacement member 620 may be actuated via an oscillating signal so as to vibrate displacement member 620. A user may be able to feel vibrations of displacement member 620, thereby providing tactile feedback to a user.

Front lighting device 630 may include a device to that provides front lighting to keypad display 600. In one implementation, front lighting device 630 may include an ambient light sensing device that causes front lighting device 630 to turn on when needed. In another implementation, front lighting device 630 may be manually turned on or off by a user of terminal 100.

Presence device 640 may include a device to sense the presence of another object, such as a user's finger or a tip of a stylus. In one implementation, presence device 640 may be part of presence sensing logic 360. Presence device 640 may be a sensor that is configured to detect a pressure, thermal energy, vibrations, changes in optical intensity, etc. Implementations may use a number of presence devices 640 operating alone or in combination to determine a location of an object with respect to keypad display 600. In one implementation, presence devices 640 may be located between housing 101 and a lower surface of keypad display 600.

Figure 6B:
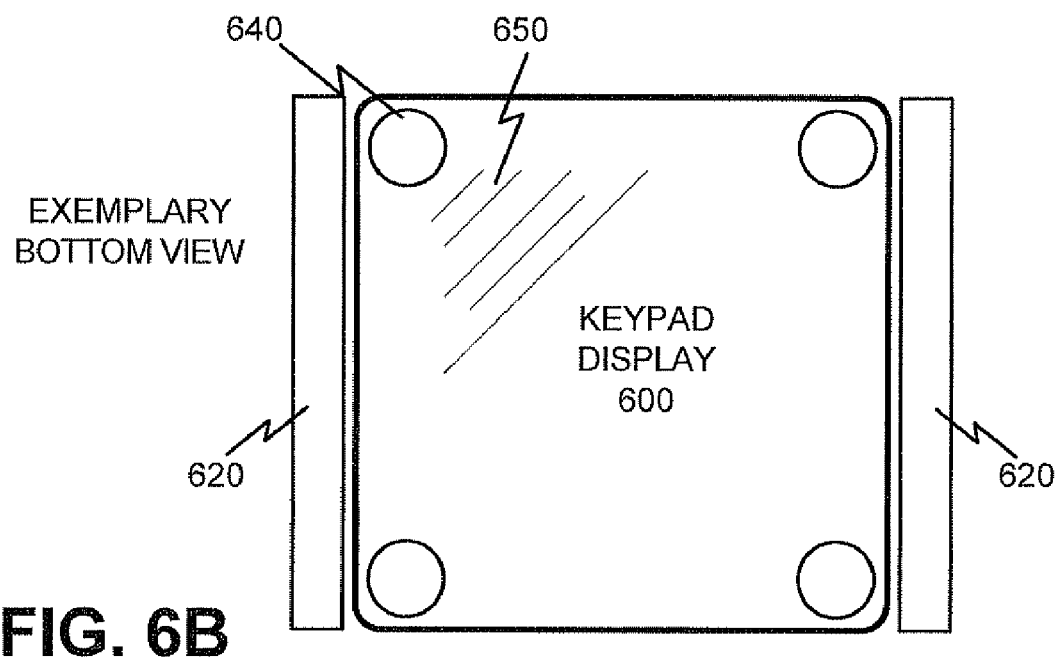
FIG. 6B illustrates a bottom view of an exemplary implementation of a programmable keypad consistent with the principles of the invention.

FIG. 6B illustrates a bottom view of an exemplary implementation of a programmable keypad consistent with the principles of the invention. The implementation of FIG. 6B may include keypad display 600, displacement member 620, presence device 640, and back lighting device 650. Back lighting device 650 may provide back lighting to a rear portion of keypad display 600. Back lighting device 650 may operate to enhance the brightness and/or contrast of information displayed via keypad display 600.

Exemplary Side View

FIG. 7 illustrates a side view of an exemplary implementation of a programmable keypad consistent with the principles of the invention. The implementation of FIG. 7 may include housing 101, pressure film 610, displacement member 620, front lighting device 630, presence device 640, overlay 710, and gasket 720. In the implementation of FIG. 7, pressure film 610, displacement member 620, front lighting device 630, presence device 640, overlay 710, and gasket 720 may be supported with respect to an interior volume of housing 101.

Overlay 710 may include a transparent or semi-transparent covering that is removeably supported above keypad display 600 via housing 101. For example, overlay 710 may be a transparent plastic sheet that is supported by a channel or shelf in housing 101. Overlay 710 may be configured to protect keypad display 600 from dirt and/or moisture. Implementations may use overlays that are tinted, have patterns etched thereon or that have contours (e.g., channels or ridges).

Gasket 720 may include a structure configured to seal a portion of housing 101 or components supported by housing 101, such as displacement member 620, presence device 640, etc. from dirt and/or moisture. Gasket 720 may be made from a flexible material, such as rubber, neoprene, or silicon, to facilitate establishing a seal. In one implementation, gasket 720 may be an O-ring.

Exemplary Overlays

FIGS. 8A-8C illustrate exemplary adaptations of overlay 710 that can be used with implementations of a programmable keypad consistent with the principles of the invention. FIG. 5A illustrates an implementation of overlay 710, identified as overlay 710A, that can be adapted to include contours. For example, overlay 710A may include ridges 820 to provide a user with a contoured surface to facilitate user interactions with keypad area 110. For example, an implementation of overlay 710A may include ridges forming a grid. The grid may form a number of cells that are sized to allow the display of numbers therethrough. The use of a grid with numbered cells may give keypad area 110 the look and feel of a conventional wireless device keypad to a user of terminal 100. Implementations of overlay 710A may include devices or structures that can create contours on demand. For example, an implementation of overlay 710A may be equipped with thin strands of "muscle wire" arranged in a determined configuration, such as a grid pattern. The strands of muscle wire may be configured to contract when a voltage or current is applied thereto. The contraction of the muscle wires may cause portions of overlay 710A to become raised to produce one or more contours. When the muscle wires are allowed to relax, such as by removing the applied current, the contours caused by contraction of the muscle wires may disappear.

FIG. 8B illustrates an implementation of overlay 710, implemented as overlay 710B, that includes contours that are lenticular, referred to herein as lenticules. Overlay 710B may have a length 830 and width 840 and may include a group of lenticules 850. Lenticules 850 may be arranged to allow incident illumination 860 to enter substantially parallel to an axis of the lenticules 850. Lenticules 850 may be configured to direct reflected illumination 870 toward an upper surface of keypad display 600. Overlay 710B may be used to provide front lighting for keypad display 600. FIG. 8C illustrates an exemplary lenticule 850 that may have an inner volume, a radius 880, a width 885 and a height 890. The dimensions of the lenticule of FIG. 8C may be varied to as to achieve desired optical characteristics.

Exemplary Processing

Figure 9:
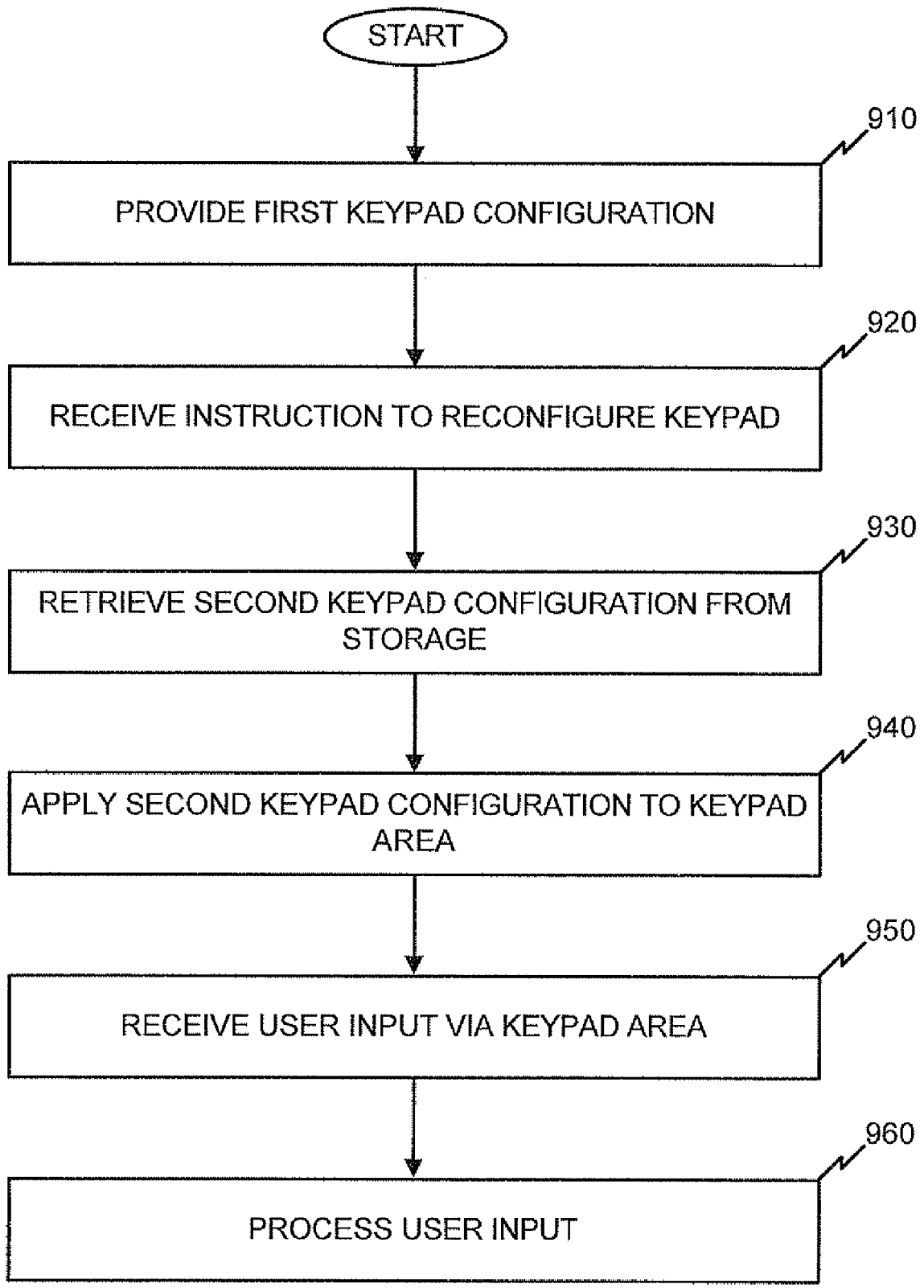
FIG. 9 is a flowchart of exemplary processing consistent with the principles of the invention.

FIG. 9 is a flowchart of exemplary processing consistent with the principles of the invention. Terminal 100 may provide a first keypad configuration to a user of terminal 100 (act 910). For example, keypad area 110 may be configured to provide a first display that includes keys 112. A user may use keys 112 to dial a telephone number of a destination device. After making a call, or during a call, the user may wish to interact with a different keypad layout.

Terminal 100 may receive an instruction to reconfigure keypad area 110 (act 920). For example, a user may be presented with a menu of selections that allows the user to select a keypad layout from a number of available keypad layouts. For example, a user may be presented with menu allowing the user to select a first keypad layout in a first language, such as English, a second keypad layout in a second language, such as Swedish, a third keypad layout that includes symbols (e.g., icons) representing destination devices, such as telephones associated with called parties, a fourth keypad layout that includes writing area 570, and a fifth keypad layout that is used to play music on terminal 100. Implementations may also provide the user with a menu of available selections via display 140. The user may depress a control key 120 to select one of the available keypad layouts to reconfigure keypad area 110.

Processing logic 210 may receive a signal from I/O logic 250 and may retrieve computer-readable instructions from storage 220 (act 930). For example, processing logic 210 may receive a signal associated with the control key 120 used to select one of the available keypad layouts. Processing logic 210 may then access data structure 400 and may determine that the user input is requesting a music keypad layout, such as the layout associated with entry 404 (FIG. 4) and FIG. 5B. In other implementations, processing logic 210 may detect the launching of a particular application program stored in terminal 100, such as a media playing application, a text messaging (e.g., an e-mail program, an instant messaging program, etc.), detect an input associated with a particular function or application, such as the turning on of a camera function, the pressing of a shutter button, etc., and automatically access data structure 400 to identify a particular keypad layout.

In each case, processing logic 210 may provide the retrieved keypad layout to programmable keypad logic 240 (act 940). Assume that the relevant keypad layout is the music keypad layout. In this case, control logic 310 (FIG. 3) may provide instructions to display logic 320 to render the music keypad layout to the user via keypad display 600. The user may interact with terminal 100 via keypad area 110 based on the music keypad layout. For example, the user may depress skip ahead button 530 (FIG. 5B) (act 950). Pressure film 610 may be compressed by the user's finger or a stylus and a capacitance of pressure film 610 may change. The capacitance change may be detected by pressure sensing logic 340. Pressure sensing logic 340 may provide a signal to control logic 310 and/or displacement logic 350. For example, pressure sensing logic 340 may send a signal to displacement logic 350 to cause displacement member 620 to move so as to cause terminal 100, or a portion thereof to vibrate. The user may sense the vibration and may release pressure from pressure film 610. Alternatively, an audible or visual signal may be provided to the user. For example, skip ahead button 530 may change color or may blink when an input associated with skip ahead button 530 is registered.

Processing logic 210 may receive the signal for skip ahead button 530 and may process the signal (act 960). Processing logic 210 may interact with a memory containing songs associated with an album that is playing on terminal 100. Processing logic 210 may index to a next song of the stored album and may cause that song to be played over speaker 130.

EXAMPLES

Figure 10A:
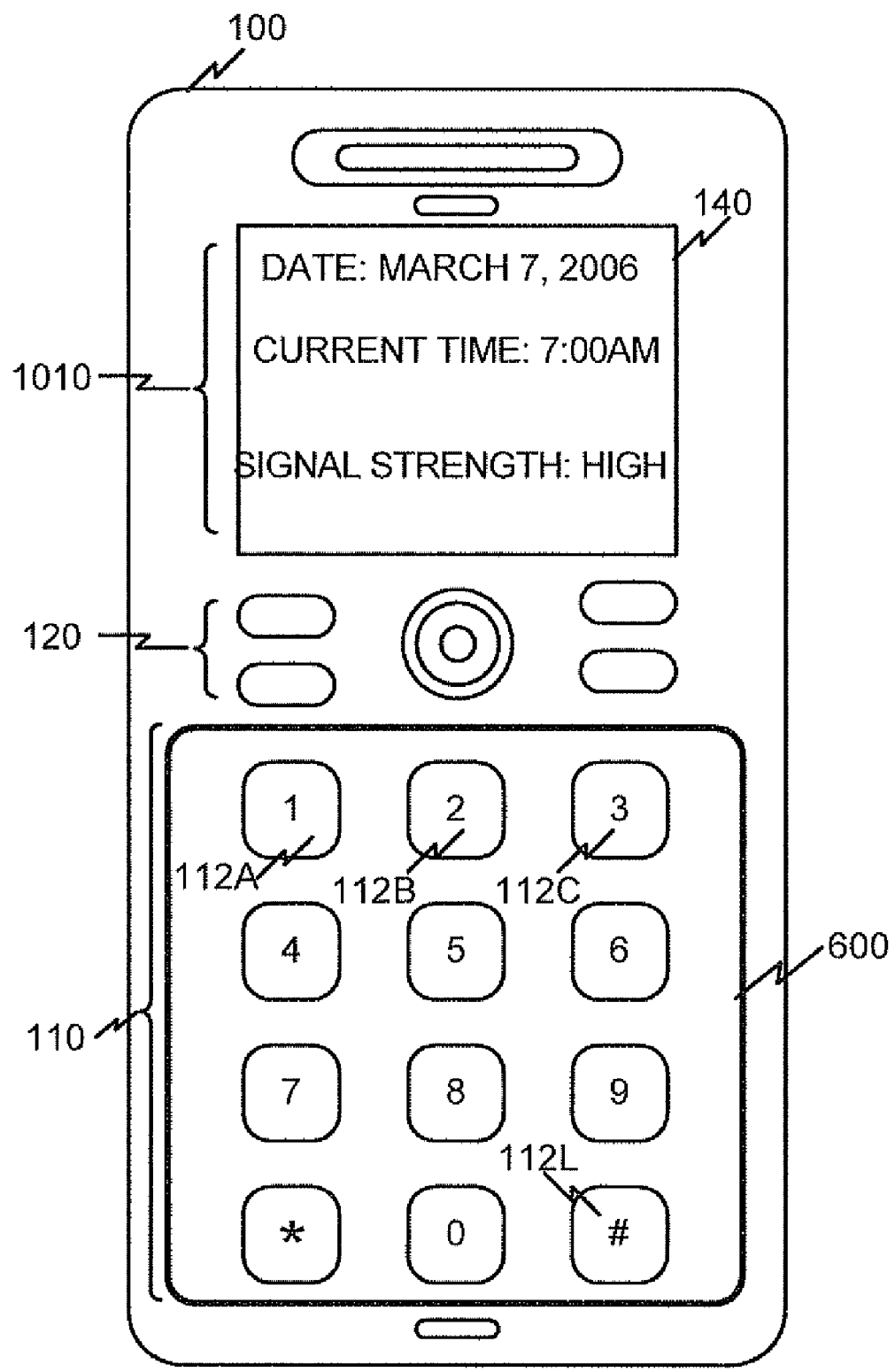
FIGS. 10A-10C illustrate examples of exemplary configurations of a mobile terminal that employs a programmable keypad consistent with the principles of the invention.
Figure 10B:
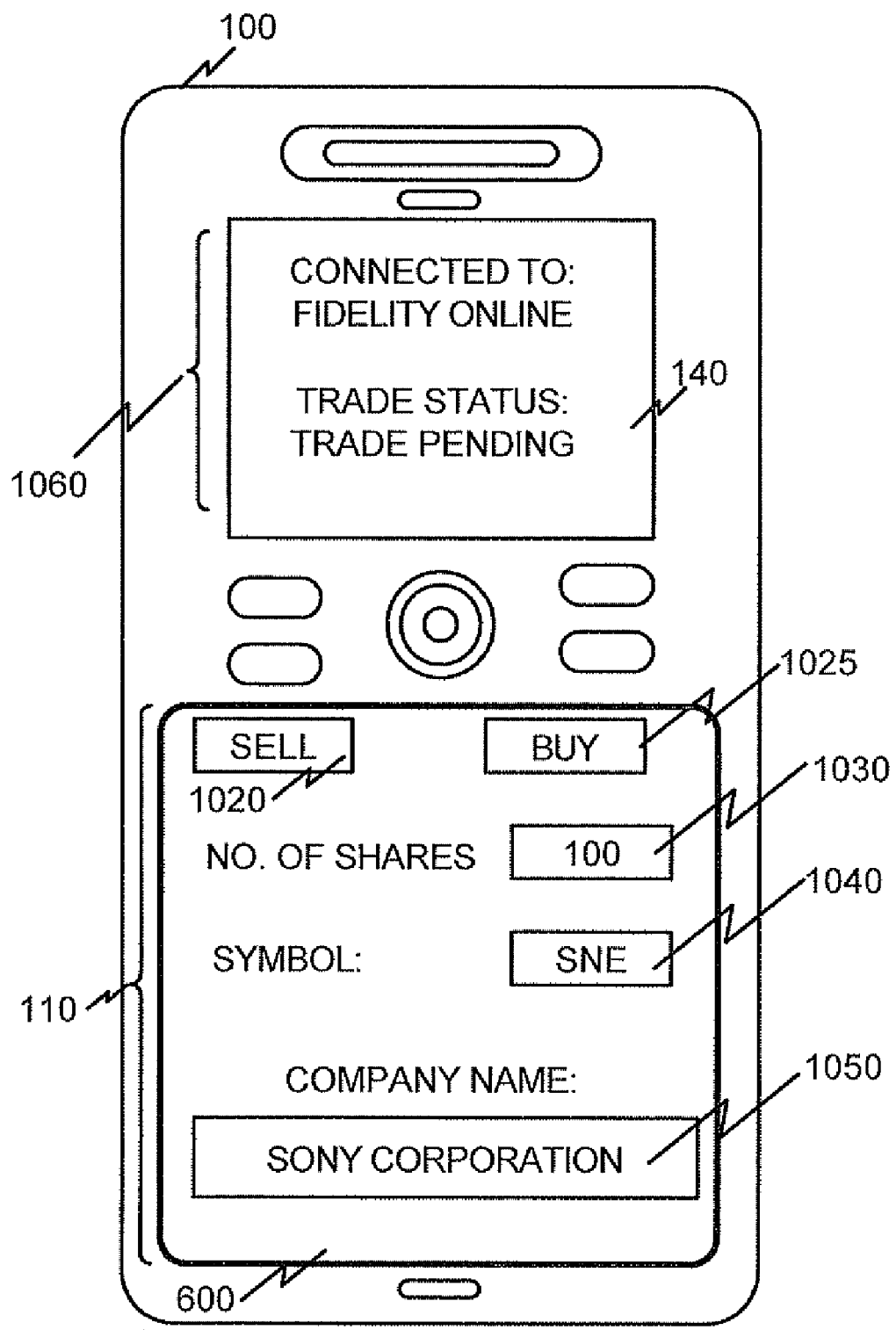
Figure 10C:
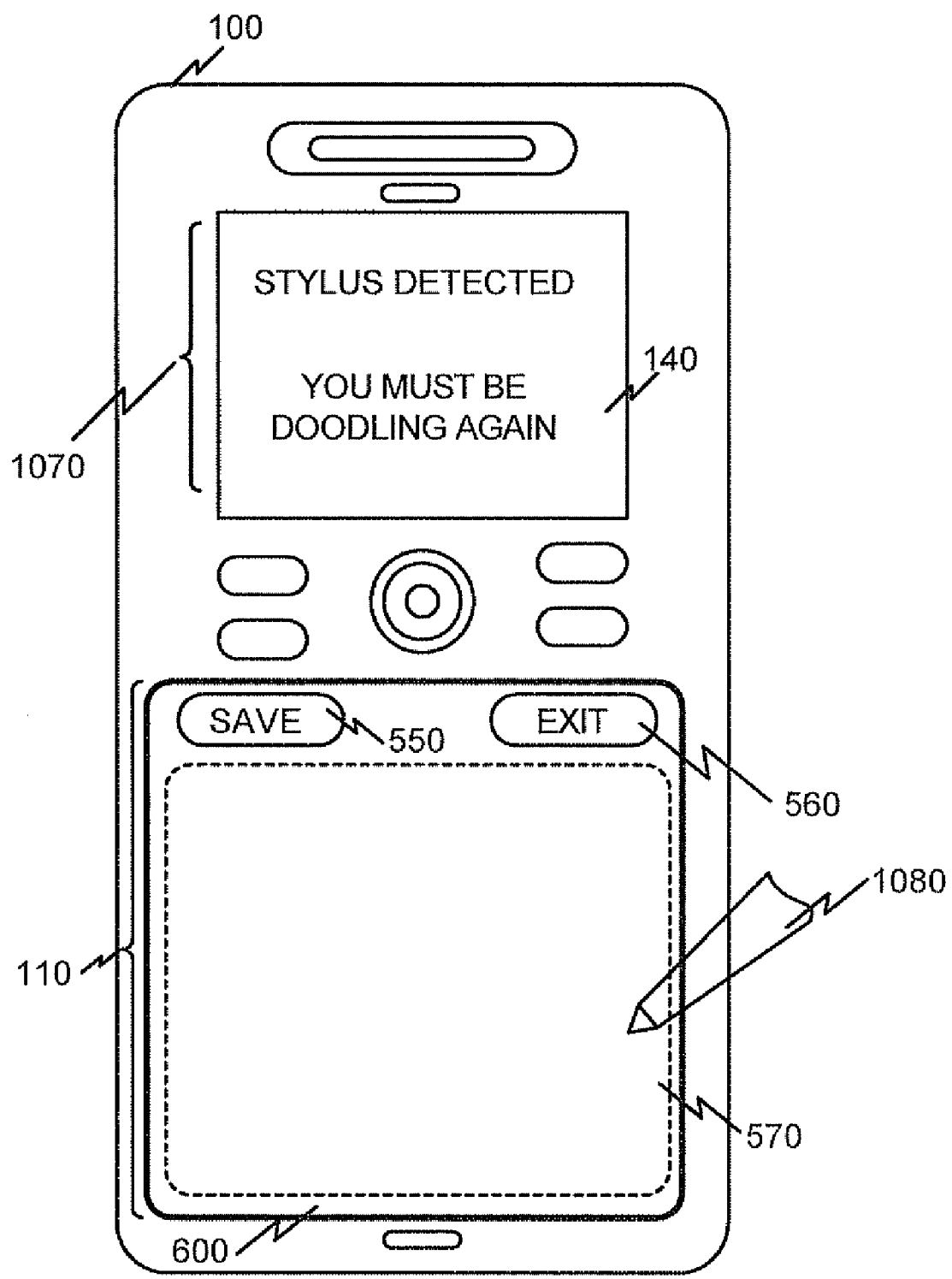

FIGS. 10A-10C illustrate additional exemplary configurations of a mobile terminal that employs a programmable keypad consistent with the principles of the invention. The examples illustrated in FIGS. 10A-10C are representative of three types of keypad configurations that may be used with implementations of terminal 100 that employ a programmable keypad consistent with the principles of the invention. Substantially any type, configuration, or combination of display configurations may be used with terminal 100, therefore the example illustrated in FIGS. 10A-10C is representative, not limiting, of display types, configurations, and combinations that may be used with terminal 100.

A user may provide an input to terminal 100 via a key based input device, such as control key 120, via speech, such as a command spoken into microphone 150 or 150A, via pressure on display 140, such as via an entry on a touch sensitive display, or via keypad area 110, such as by pressing on a portion of pressure film 610 (not shown) covering keypad display 600 with a user's digit, such as a finger, or stylus. In response to the user input, the display configuration of FIG. 10A may be provided via terminal 100. For example, depressing one of control keys 120 may cause the date and current time information to be displayed on display 140. Depressing one of control keys 120 may further execute a menu selection displayed via keypad area 110 and may cause keys 112A-L to be displayed via keypad display 600.

In FIG. 10A, keypad area 110 may include a number of keys 112A-L that resemble keys on a standard telephone keypad used with desktop or mobile phones. Display 140 may be configured to provide information to the user that is related to information displayed via keypad display 600 in keypad area 110. For example, display 140 may present the user with information about a current date and time and with information about received signal strength. The received signal strength may inform the user about the quality of calls made from a current location using keys 112A-L.

A user may place a call to a destination device, such as another mobile terminal, using the keypad configuration of FIG. 10A. After completing the call, the user may desire to configure terminal 1100 and keypad area 110 in another way. The user may provide an input to terminal 100 via control buttons 120, microphones 150 or 150A, display 140 or keypad area 110 via a menu, etc. For example, the user may provide an input for a stock trading keypad configuration via control keys 120, via a voice command, such as "stock screen," etc. In response to the user input, keypad area 110 may be reconfigured to display stock information that allows the user to buy or sell stocks. The reconfigured keypad area 110 may be similar to keypad area 110 shown in FIG. 10B.

FIG. 10B illustrates a keypad area 110 that is configured to allow the user to buy or sell stocks or other securities. For example, keypad display 600 may provide the user with sell button 1020, buy button 1025, a number of shares field 1030, a symbol field 1040 and a company name field 1050. Sell button 1020 may include a radio button that causes information included in number of shares field 1030, and symbol field 1040 to be sent to a destination when sell button 1020 is contacted via a finger or stylus. Instructions related to sell button 1020 may also be activated via speech commands using microphones 150 or 150A and speech processing logic operating in terminal 100. For example, instructions related to sell button 1020 may send instructions to a server operating at a brokerage house. The instructions may be configured to instruct the server to purchase an indicated number of shares on behalf of the user of terminal 100.

Buy button 1025 may include a radio button that causes information contained in number of shares field 1030 and symbol field 1040 to be sent to a destination, such as a server. Instructions related to buy button 1025 may cause an indicated number of shares to be purchased on behalf of a user of terminal 100.

Number of shares field 1030 may be used to receive information from the user about a number of shares of stock that the user wishes to buy or sell. Symbol field 1040 may include information about an exchange symbol related to the name of a company identified in company name field 1050. The exchange symbol may be an identifier that is used to determine which company's shares are to be purchased or sold. Company name field 1050 may include the full name of a company whose symbol is displayed in symbol field 1040.

Display 140 may operate with keypad display 600 to provide the user with additional information. For example, display 140 may provide the user with trade information 1060. Trade information 1060 may provide the user with information about a brokerage house with which the user is connected and with information about the status of a purchasing transaction or selling transaction that the user has requested via terminal 100.

After making the stock trade illustrated in FIG. 10B, the user may desire to reconfigure terminal 100. For example, the user may wish to write or draw in keypad area 110 using a stylus. The user may provide an input to terminal 100 via control keys 120, microphones 150 or 150A, display 140 or a menu selection displayed via keypad display 600 in keypad area 110. In response to the user input, keypad area 110 may be reconfigured as shown in FIG. 10C.

In FIG. 10C, the user may write or draw in writing area 570 of keypad display 600 using stylus 1080. The user may touch save button 550 or exit button 560 with stylus 1080 or a finger to save the contents of writing area 570 or to exit the writing application, respectively. Display 140 may operate with information displayed in keypad area 110 or with a configuration of keypad area 110 to provide the user with additional information. For example, in one implementation display 140 may be configured to display computer generated letters corresponding to letters handwritten by the user. Assume that the user writes the word "car" in script. Terminal 100 may employ character recognition logic to identify the letters "c," "a," and "r." Terminal 100 may display "car" in display 140 via a conventional font used with computers, such as "times new roman," or terminal 100 may translate car into another language and may display the translated word for car in display 140. In a second implementation, display 140 may provide the user with information 1070. Information 1070 may inform the user about a mode that keypad area 110 is currently operating in. Information 1070 may also provide the user with other information, for example, the user may configure terminal 100 to provide him/her with jokes, such as a joke of the day, a word or phrase of the day, or with humorous comments about the user's interactions with terminal 100.

When the user is finished with the configuration of FIG. 10C, the user may reconfigure terminal 100 in still other ways consistent with the principles of the invention.

CONCLUSION

Implementations consistent with the principles of the invention may facilitate providing a number of keypad configurations to a user via a programmable keypad. In some implementations, the keypad configurations may be application controlled and may be automatically provided in response to inputs associated with the particular applications. In some implementations, terminal 100 may be configured to provide keypad layouts in number of languages based on user preferences. Terminal 100 may reconfigure keypad area 110 based on a user preference to display information to the user in a preferred language. The user may also configure how information is arranged within keypad area 110 by specifying features such as an arrangement of buttons, icons, images, etc.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

While a series of acts has been described with regard to FIG. 9, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as hardwired logic, an application specific integrated circuit, a field programmable gate array or a microprocessor, software, or a combination of hardware and software.

It should be emphasized that the term "comprises/comprising" when used in this specification and/or claims is taken to specify the presence of stated features, integers, steps or components but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
    a memory to store:
        information associated with a plurality of keypad layouts, the information comprising:
            display information or a configuration to be provided on the plurality of keypad layouts,
            feedback information associated with a type of feedback to be provided to a user in response to detection of an input on the plurality of keypad layouts,
            lighting information identifying whether front lighting or back lighting is to be provided for the plurality of keypad layouts, and
            input information identifying one or more types of input to be used with the plurality of keypad layouts and information about thresholds used with the identified one more types of input,
        where at least some of the plurality of keypad layouts provide at least two of: different types of feedback to the user in response to detection of an input, different types of lighting, or different types of input to be used; and
    logic configured to:
        process a request for a first keypad layout, of the plurality of keypad layouts,
        access the memory to identify information associated with the first keypad layout, and
        provide the first keypad layout via a keypad display in response to the processed request, the first keypad layout providing the display information or configuration, the type of feedback, and the front lighting or back lighting identified by the information stored in the memory and being responsive to the one or more types of input and thresholds identified by the information stored in the memory.

2. The device of claim 1, where the logic is further configured to:
    apply power to the keypad display to provide the first keypad layout, and
    remove power from the keypad display without erasing the first keypad layout.

3. The device of claim 2, where the logic is further configured to:
    reapply power to the keypad display to modify the first keypad layout.

4. The device of claim 1, where the logic is further configured to:
    receive a user request via the keypad display, and modify the first keypad layout in response to the user request.

5. The device of claim 1, further comprising:
    a display, and
    where the logic is further configured to:
        receive an input associated with a first one of a plurality of applications or functions provided by the device, and
        provide a keypad layout that is associated with the first application or function via the keypad display.

6. The device of claim 1, where the logic is further configured to:
    detect a presence of a user or an input device,
    acknowledge the presence via the keypad display, and
    modify the first keypad layout in response to the acknowledged presence.

7. The device of claim 1, where the logic is further configured to:
    detect a pressure, at the keypad display, related to a user request, and
    use the detected pressure to initiate processing of the user request.

8. The device of claim 1, where the logic is further configured to:
    provide front lighting or back lighting to the keypad display based on the first keypad layout and the lighting information stored in the memory, and
    provide back lighting to the keypad display for a second keypad layout based on the lighting information stored in the memory.

9. The device of claim 1, where the logic is further configured to:
    allow a user to request the keypad layout using at least one of a control key, a function button, a voice input, a menu selection, or a touch input.

10. A methods comprising:
    providing a first keypad layout via a programmable keypad;
    receiving an input via the programmable keypad, a display device, an input device, or a spoken command;
    identifying, in response to the input, information associated with a second keypad layout, the information comprising:

display information to be provided via the second keypad layout, feedback information identifying a type of feedback to be provided in response to input on the second keypad layout, lighting information identifying whether the second keypad layout is associated with a type of front lighting or back lighting associated with the second keypad layout, and input information identifying one or more types of input and one or more input thresholds to be used with the second keypad layout, where at least two: of the type of feedback information, the type of the lighting information, and the one or more types of the input information for the second keypad layout are different than the type of feedback information, the type of lighting information, and the types of input associated with the first keypad layout; and providing the second keypad layout via the programmable keypad in response to the input.

11. The method of claim 10, where the providing a first keypad layout further comprises:

providing the first keypad layout via an electrophoretic based programmable keypad or a liquid crystal display based programmable keypad.

12. The method of claim 10, where the receiving an input further comprises:

using pressure or presence to detect the input.

13. The method of claim 10, where the receiving the input comprises:

receiving the input via a user's digit or a stylus.

14. The method of claim 10, further comprising:
acknowledging the input via tactile feedback.

15. The method of claim 10, further comprising:
illuminating a portion of the programmable keypad in response to the input.

16. The method of claim 10, further comprising;
providing information via a display device in response to the input, where the provided information is related to the first keypad layout or the second keypad layout.

17. A mobile communications terminal, comprising:

a memory to store:

information associated with a plurality of keypad configurations, the information identifying:

a type of display, a type of lighting, a type of feedback, and a type of input associated with each of the plurality of keypad configurations and information about thresholds associated with the type of input, where at least some of the plurality of keypad configurations identify:

whether front lighting or back lighting is to be provided for the plurality of keypad configurations, and different types of feedback and different types of input than types of feedback and types of input that are associated with other ones of the plurality of keypad configurations;

a display;

a programmable keypad configured to receive input from a user; and processing logic configured to:

receive a request for a configuration of the programmable keypad, access the memory to identify the type of display, front or back lighting, type of feedback, type of input associated with the requested configuration, and thresholds associated with the type of input, provide the requested configuration to the user via the programmable keypad, receive an input via the programmable keypad bused on the configuration, provide information to the user via the programmable keypad or the display based on the input, and provide feedback to the user in response to the input, the feedback corresponding to the type of feedback stored in the memory for the requested configuration.

18. The mobile communications terminal of claim 17, where the processing logic is further configured to:

receive the request via a control key, an input device associated with a function performed by the mobile communications terminal, a microphone, a touch-sensitive portion of the display, or the programmable keypad, and where when providing the information to the user via the programmable keypad, the processing logic is configured to use an electrophoretic based display or a liquid crystal display.

19. The mobile communications terminal of claim 17, where the processing logic is further configured to:

provide the requested configuration using one of a number of languages.

20. The mobile communications terminal of claim 17, where the processing logic is further configured to:

receive an input associated with a first one of a plurality of applications or functions provided by the mobile communications terminal, and provide a user interface associated with the first application or function via at least one of the programmable keypad or the display.

21. A non-transitory computer readable memory device that stores instructions executable by a processing device operating in a mobile communications terminal, the computer readable memory device comprising;

instructions to provide a first keypad layout via a programmable keypad of the mobile communications terminal;

instructions to receive an input via a programmable keypad of the mobile communications terminal, a display device of the mobile communications terminal, an input device of the mobile communications terminal, or a spoken command;

instructions to identify, in response to the input, information associated with a second keypad layout, the information comprising:

display information to be provided via the second keypad layout, feedback information identifying a type of feedback to be provided in response to input on the second keypad layout, lighting information identifying whether the second keypad layout is associated with a type of front lighting or back lighting associated with the second keypad layout, and input information identifying one or more types of input and one or more input thresholds to be used with the second keypad layout, where at least two of: the type of feedback information, the type of the lighting information, and the one or more types of the input information for the second keypad layout are different than the type of feedback information, the type of lighting information, and the type of input information associated with the first keypad layout; and instructions to provide the second keypad layout in response to the input.

22. A mobile communications terminal, comprising:

means for providing a first keypad layout via a programmable keypad;

means for receiving an input via the programmable keypad, a display device, an input device, or a spoken command;

means for identifying, in response to the input, information associated with a second keypad layout, the information comprising:

display information to be provided via the second keypad layout, feedback information identifying a type of feedback to be provided in response to input on the second keypad layout, lighting information identifying whether the second keypad layout is associated with a type of front lighting or back lighting associated with the second keypad layout, and input information identifying one or more types of input and one or more input thresholds to be used with the second keypad layout, where at least two of: the type of feedback information, the type of the lighting information, and the one or more types of the input information for the second keypad layout are different than the type of feedback information, the type of lighting information, and the types of input information associated with the first keypad layout; and means for providing the second keypad layout via the programmable keypad in response to the input.

* * * * *

UNITED STATES PATENT AND TRADEMARK OFFICE
CERTIFICATE OF CORRECTION

PATENT NO. : 8,068,605 B2
APPLICATION NO. : 11/627003
DATED : November 29, 2011
INVENTOR(S) : Per Holmberg It is certified that error appears in the above-identified patent and that said Letters Patent is hereby corrected as shown below:

In claim 11, column 17, line 25, change the spelling of the word "clcctrophorctic" to "electrophoretic."

Signed and Sealed this
Fourteenth Day of February, 2012

David J. Kappos
*Director of the United States Patent and Trademark Office*